United States Patent
Kazanbas et al.

(10) Patent No.: US 9,281,755 B2
(45) Date of Patent: Mar. 8, 2016

(54) INVERTER WITH COUPLED INDUCTANCES

(71) Applicant: SMA Solar Technology AG, Niestetal (DE)

(72) Inventors: Mehmet Kazanbas, Kassel (DE); Christian Noeding, Knuellwald-Remsfeld (DE); Peter Zacharias, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 195 days.

(21) Appl. No.: 14/176,191

(22) Filed: Feb. 10, 2014

(65) Prior Publication Data

US 2014/0153298 A1    Jun. 5, 2014

Related U.S. Application Data

(63) Continuation of application No. PCT/EP2012/065193, filed on Aug. 2, 2012.

(30) Foreign Application Priority Data

Aug. 17, 2011    (DE) .......................... 10 2011 052 768

(51) Int. Cl.
*H02M 7/537*    (2006.01)
*H02M 5/458*    (2006.01)
*H02M 7/538*    (2007.01)

(52) U.S. Cl.
CPC .............. *H02M 5/458* (2013.01); *H02M 7/538* (2013.01)

(58) Field of Classification Search
CPC ....... H02M 1/12; H02M 1/32; H02M 7/5395; H02M 7/5387; H02M 7/53871; H02M 7/445; H02M 7/51; H02M 7/7537; H01L 25/03

USPC .................. 363/40–41, 55, 56.01, 56.02, 98, 363/120–121, 123, 131–132

See application file for complete search history.

(56) References Cited

U.S. PATENT DOCUMENTS 7,944,091 B2    5/2011    Zacharias et al.
8,315,076 B2    11/2012    Schmidt et al.
(Continued)

FOREIGN PATENT DOCUMENTS

DE            19642522 C1    4/1998
DE       102006016284 A1    7/2007
(Continued)

OTHER PUBLICATIONS

International Search Report dated Oct. 25, 2012 for International application No. PCT/EP2012/065193. 10 Pages.
(Continued)

*Primary Examiner* — Nguyen Tran
(74) *Attorney, Agent, or Firm* — Eschweiler & Associates, LLC (57) ABSTRACT

An inverter for converting a direct current flowing between two input lines into an alternating current flowing between two output lines includes first and second series circuits each including two switches configured to switch at a high frequency and of an inductance connected between the switches, wherein the two inductances are magnetically coupled. The inverter further includes diodes which lead from opposite sides of the inductances to a first intermediate point and diodes leading from a second intermediate point to the opposite sides of the inductances, and an unfolding circuit which forwards a direct current flowing between the intermediate points and consisting of sine-shaped half-waves to the output lines with a polarity changing half-wave by half-wave.

10 Claims, 5 Drawing Sheets

(56) References Cited

U.S. PATENT DOCUMENTS

| | | | |
|---|---|---|---|
| 2009/0103340 A1* | 4/2009 | Bremicker | H02M 1/15 363/123 |
| 2009/0201706 A1 | 8/2009 | Zacharias et al. | |
| 2009/0251937 A1 | 10/2009 | Schmidt et al. | |
| 2010/0085788 A1* | 4/2010 | Zacharias | H02M 7/48 363/123 |
| 2011/0019448 A1* | 1/2011 | Miyake | H02M 7/5387 363/123 |
| 2011/0032733 A1 | 2/2011 | Watanabe et al. | |
| 2012/0134180 A1 | 5/2012 | Watanabe et al. | |

FOREIGN PATENT DOCUMENTS

| | | |
|---|---|---|
| DE | 102007028078 A1 | 12/2008 |
| EP | 2244367 A1 | 10/2010 |
| WO | 9816994 A1 | 4/1998 |
| WO | 2011016449 A1 | 2/2011 |

OTHER PUBLICATIONS

Czogalla, Jens et al. "Automotive Application of Multi-Phase Coupled-Inductor DC-DC Converter." IEEE, 2003, pp. 1524-1529.

* cited by examiner

INVERTER WITH COUPLED INDUCTANCES

REFERENCE TO RELATED APPLICATIONS

This application is a continuation of International application number PCT/EP2012/065193 filed on Aug. 2, 2012, which claims priority to German application number 10 2011 052 768.0 filed on Aug. 17, 2011.

FIELD

The present disclosure relates to an inverter for converting a direct current flowing between first and second input lines into an alternating current flowing between first and second output lines.

BACKGROUND

An inverter for converting a direct current flowing between two input lines into an alternating current flowing between two output lines performing as a current source, and comprising a series circuit made of a first high frequency switch, an inductance and a second high frequency switch, and connected between the two input lines is known from DE 196 42 522 C1. Here, one of the output lines is directly connected to one of the input lines. An unfolding circuit of the known inverter comprises a first low frequency switch leading from the first intermediate point to the other output line, and a second low frequency switch leading from the second intermediate point to the other output line. Further, a third low frequency switch is provided between the second intermediate point and the one output line directly connected to the one input line. By high frequency operating the two high frequency switches on both sides of the inductance, the half-waves of the desired alternating current are formed. Here, the high frequency switch located on that side of the inductance from which the first rectifier diode leads to the first intermediate point is closed for those half-waves of the alternating current output at negative voltage between the output lines. During these negative half-waves, the first low frequency switch of the unfolding circuit is closed. The two other low frequency switches of the unfolding circuit are open. During the half-waves of the alternating current output at positive voltage between the output lines, the two high frequency switches connected in series with the inductance are operated at a high frequency, and the second low frequency switch of the unfolding circuit connected between the first intermediate point and the other output line and the third low frequency switch of the unfolding circuit connected between the second intermediate point and the one output line connected to the one input line are closed. Buffer capacitances are provided both between the output lines and between the input lines of the known inverter. In a real application of this known inverter, the buffer capacitance between the output lines is supplemented with an inductance in one of the output lines to make up an LC-filter for reducing a current ripple of the alternating current generated by the known inverter, i.e. for reducing variations of the alternating current at a high frequency due to its formation by means of high frequency switches. This current ripple is an essential disadvantage of the known inverter. Additionally, it has no flexibility with regard to earthing a photovoltaic generator connected to its input lines. Particularly, earthing is only possible at that input line which is directly connected to the other output line.

Depending on the type of solar modules of the photovoltaic generator, it may, however, be suitable to operate the photovoltaic generator either completely at negative or completely at positive electrical potential with regard to earth. Under certain conditions, like for example in order to limit the voltage with regard to earth, it may also be suitable to connect a center point of the photovoltaic generator to earth. This flexibility is not given with the known inverter.

An inverter comprising a series circuit made of a first high frequency switch, an inductance and a second high frequency switch and connected between two input lines is known from DE 10 2007 028 078 B4. A first rectifier diode leads from one side of the inductance to one terminal of a voltage link, and a second rectifier diode of opposite blocking direction leads from the second side of the inductance to the other terminal of the voltage link. The voltage link comprises a link capacitance; and a half-bridge made of two switches with anti-parallel diodes is connected between its terminals. A center point of the half-bridge is connected to the L-conductor of a connected AC power grid via a grid choke. The N-conductor of the AC power grid is connected to a center point of the link capacitance. The switches of the half-bridge are operated at a high frequency to shape an alternating current driven by the link voltage of the voltage link. Here, a grid choke is essential to limit the current ripple of the alternating current fed into the AC power grid. The known inverter with the pronounced voltage link is a typical representative of a voltage source inverter. The inductance of its series circuit may be coupled to a further inductance which is connected to the voltage link via an additional diode and which also loads the voltage link. In this embodiment of the known inverter, one of its input lines may be freely selected for being connected to earth.

EP 2 244 367 A1 discloses a boost converter assembly connected between a photovoltaic generator and a voltage link at the input side of an inverter bridge. The boost converter assembly comprises a plurality of boost converter units each comprising a controllable switch and an input inductor. The plurality of boost converter units are connected in parallel and provide a DC link voltage at the voltage link that is higher than a DC voltage provided by the photovoltaic generator. The individual boost converter units are operated in an interleaving mode.

US 2009/0251937 A1 discloses a circuit arrangement for converting a DC voltage present at DC voltage terminals into an alternating current which is supplied via AC voltage terminals. The circuit arrangement has a first series circuit which is connected to the DC voltage terminal and comprises a first electronic switch and an inductor. The circuit arrangement further comprises a plurality of second electronic switches. One of the DC voltage terminals and one of the AC voltage terminals are connected to a neutral conductor. The inductor is in the form of a twin inductor having two windings which are arranged tightly coupled to one another, wherein the first winding is connected in series with the first electronic switch and buffer-stores the energy produced via the electronic switch. The two windings are each connected to the AC voltage terminal which is not connected to the neutral conductor via one of the second electronic switches. One of these second electronic switches is closed during the half-waves of the alternating current with positive voltage between the AC voltage terminals, whereas the other of the second electronic switches is closed during the half-waves of the alternating current at negative voltage at the AC voltage terminals. Thus, the first winding and the second winding of the inductor alternatingly provide the alternating current formed by operating the first switch at a high frequency half-wave by half-wave. In one embodiment of the known circuit arrangement two series circuits each comprising a first electronic switch and an inductor are provided and connected in parallel to the two second electronic switches. Here, the first switches of the two series circuits are operated at an offset to have a more uniform flow of energy.

WO 2011/016449 A1 discloses a DC/DC converter comprising two groups of four switching elements. The four switching elements of one of the two groups are arranged in two half-bridges between the input lines of the DC/DC converter, and the four switching elements of the other of the two groups are arranged in two half-bridges between the output lines of the DC/DC converter. One center point of each half-bridge of the one group is connected to one center point of a half-bridge of the other group via a primary winding of a magnetic field cancellation type transformer, whereas the center point of the other half-bridge of the one group is connected to the center point of the other half-bridge of the other group via a secondary winding of the transformer. Further, one of the input lines is directly connected to one of the output lines. The DC/DC converter is capably of varying boosting and bucking ratios and a bidirectional boosting-bucking operation.

There still is a need of an inverter for converting a direct current flowing between two input lines into an alternating current flowing between two output lines which does not require a high performance LC-filter for removing a current ripple.

SUMMARY

The present disclosure relates to an inverter for converting a direct current flowing between first and second input lines into an alternating current flowing between first and second output lines. The inverter comprises a first series circuit comprising a first switch switchable at a high frequency, a first inductance and a second switch switchable at a high frequency, and connected between the two input lines. The inverter further comprises a second series circuit comprising a third switch switchable at a high frequency, a second inductance and a fourth switch switchable at a high frequency, and connected between the two input lines. The first and second inductances are magnetically coupled. The inverter further comprises a first rectifier diode leading from a first side of the first inductance to a first intermediate point, a second rectifier diode leading from a second intermediate point to a second side of the first inductance, a third rectifier diode leading from a first side of the second inductance to the first intermediate point, and a fourth rectifier diode leading from the second intermediate point to the second side of the second inductance. The inverter also comprises an unfolding circuit connected to the first and second intermediate points and to the first and second output lines, and comprising switches switchable at the frequency of the alternating current.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure can be better understood with reference to the following drawings. The components in the drawings are not necessarily to scale, emphasis instead being placed upon clearly illustrating the principles of the present disclosure. In the drawings, like reference numerals designate corresponding parts throughout the several views.

DETAILED DESCRIPTION

In this description, the term capacitance is used to refer to one or more capacitors connected in parallel and/or series for providing an electric capacitance. Similarly, the term inductance refers to one or more inductors connected in series and/or parallel for providing an electric inductance.

The present disclosure relates to an inverter comprising a series circuit comprising a first switch switchable at a high frequency, an inductance and a second switch switchable at a high frequency, and connected between the first and second input lines; a first rectifier diode leading from a first side of the inductance to a first intermediate point, and a second rectifier diode leading from a second intermediate point to a second side of the inductance; and an unfolding circuit connected to the first and second intermediate points and the first and second output lines, and comprising switches switchable at the frequency of the alternating current.

Due to its properties similar to a current source, such an inverter is also referred to as a current source inverter.

Particularly, the present disclosure relates to inverters for feeding electric energy produced by a photovoltaic generator into a single-phase AC power grid.

The present disclosure distinguishes between switches switchable at a high frequency which are also referred to as high frequency switches here without intending any limitation to a particular high frequency (HF) range, and switches switchable at the frequency of the alternating current which are also referred to as low frequency switches here. The high frequency switches are configured for being suitably operated at a frequency in the range of 1 to some 10 kHz, whereas the low frequency switches are configured for being suitably operated at a frequency of about 500 Hz at maximum. Typically, the low frequency switches are operated at a frequency of about 50 to 60 Hz. "Suitably operated" means that the switches can be switched or operated at the respective frequency for an extended period of time without producing excessive power losses.

In the inverter according to the present disclosure, besides a first series circuit made of a first switch switchable at a high frequency, a first inductance and a second switch switchable at a high frequency, a further series circuit made of a third switch switchable at a high frequency, a second inductance and a fourth switch switchable at a high frequency is connected between the first and second input lines. Further, the first inductance of the first series circuit and the second inductance of the second series circuit are magnetically coupled. A rectifier diode leads from a first side of the first inductance to a first intermediate point to which a further rectifier diode, which is also referred to as the third rectifier diode here, leads from a corresponding first side of the second inductance of the second series circuit; and a second and a fourth rectifier diode lead from a second intermediate point to corresponding second sides of the first and second inductance of the first and second series circuits, respectively.

In operation of the new inverter, a current flows between the first and second intermediate points whose direction is determined by the blocking directions of the first to fourth rectifier diodes and which—at the same time—is sine-shaped half-wave by half-wave by means of high frequency operating the switches switchable at a high frequency. Typically, this high frequency is in a range of a few kilohertz. This sine shape is provided nearly without current ripple because the current—despite being sine-formed—for example, by direct pulse width modulation, may flow through the alternatingly operated series circuits nearly without interruption. Thus, an unfolding circuit connected to the first and the second intermediate point has only to forward this direct current with alternating polarities to the output lines half-wave by half-wave. No filtering of this alternating current is required.

In practice, the present disclosure—despite the second inductance in the second series circuit between the input lines—results in a reduced building size. Particularly, an LC-filter and thus a big grid choke can be completely avoided. At the same time, the smaller inductances of the two series circuits may each be made much smaller than an inductance of a single series circuit between the input lines. From the point of view of the inductances, the effective frequency is increased by a factor of two with regard to the actual switching frequency due to the magnetic coupling. Thus, the size of each inductor may be reduced by at least 30% as compared to individual circuitries without magnetic coupling. The inverter of the present disclosure does not only work without a capacitance of an LC-filter but also without a voltage link capacitance. However, providing a small smoothing capacitance prior to or behind the unfolding circuit which provides for additionally smoothing the shaped alternating current may be advantageous under certain conditions. Principally, however, the inverter of the present disclosure has a buffer capacitance between its input lines.

The high frequency switches of the inverter of the present disclosure are both subjected to a lower voltage load and a lower current load as compared to an inverter only comprising one series circuit comprising an inductance between the input lines. Thus, the dimension of the high frequency switches may be kept smaller which at least partially compensates for the additional high frequency switches. The switches switchable at the frequency of the alternating current of the unfolding circuit may be made as backflow blocking switches like for example low-cost grid thyristors due to the avoided output side inductance. Further, so-called normally-on silicon carbide (SiC) semiconductor technology may be used with the high frequency switches as—due to the two current branches via the two series circuits between the input lines—both the load to the switches and the short-circuit risk are reduced.

In the new inverter, either one of the first and second input lines or any other point at the input side, like for example a center point of a photovoltaic generator connected to the input lines may be earthed as desired. The earthed input line may be directly connected to an also earthed output line. This, however, is not essential for the function of the inverter of the present disclosure.

In the inverter of the present disclosure, the number of the series circuits of two high frequency switches and an intermediate inductance each connected in parallel to each other between the input lines is not limited to two. Thus, there may, for example, be a third series circuit comprising a fifth switch switchable at a high frequency, a third inductance and a sixth switch switchable at a high frequency, and connected between the two input lines. In this case, the first inductance, the second inductance and the third inductance are magnetically coupled, and a fifth rectifier diode leads from a first side of the third inductance to the first intermediate point, and a sixth rectifier diode leads from the second intermediate point to a second side of the third inductance. It is to be understood that the first side from which the fifth rectifier diode leads to the first intermediate point points towards the same first input line as the first sides of the first and second inductances from which the first and second rectifier diodes lead to the first intermediate point. Similar rules apply to the second sides of the inductances to which the second, fourth and sixth rectifier diodes lead from the second intermediate point, and which point towards the same second input line. At this point, it may be noted that the direction in which the respective rectifier diode "leads" here refers to its conducting direction, and that the conducting directions of the rectifier diodes are each oriented in such a way that a current flux from the input lines to the output lines is only possible through the respective inductance. Even with a closed neighboring high frequency switch no direct flow from the neighboring input line is possible as such a flow would be blocked by the rectifier diodes.

The unfolding circuit may particularly be a commutator circuit comprising a full bridge between the first and the second intermediate points, and it may correspondingly comprise a first switch switchable at the frequency of the alternating current and connected to the first intermediate point and to the first output line, a second switch switchable at the frequency of the alternating current and connected to the second intermediate point and to the first output line, a third switch switchable at the frequency of the alternating current and connected to the first intermediate point and to the second output line, and a fourth switch switchable at the frequency of the alternating current and connected to the second intermediate point and to the second output line.

The low frequency switches of the unfolding circuit may be operated by a controller which also operates the high frequency switches of the series circuits between the input lines. It is also possible to provide a control circuit for line commutation of the switches of the unfolding circuit by means of an alternating current grid connected to the output lines. Such line commutated unfolding circuits are generally known.

Although usually only the low frequency switches and no inductances of LC-filters and the like are provided in the power current paths extending from the first intermediate point and the second intermediate point up to an alternating current grid connected to the output lines, the inverter may nevertheless comprise a protective circuitry connected between the first intermediate point and the second intermediate point. The protective circuitry may comprise two series circuits of two oppositely oriented rectifier diodes each connected in parallel, the rectifier diodes of the two series circuits comprising opposite blocking directions, and intermediate points of the two series circuits being connected to each other via a capacitance and a varistor connected in parallel. This protective circuitry provides a dynamic clamping function which is both effective in the direction of the alternating current grid and in the direction of a photovoltaic generator connected to the input lines of the inverter of the present disclosure.

Figure 1:
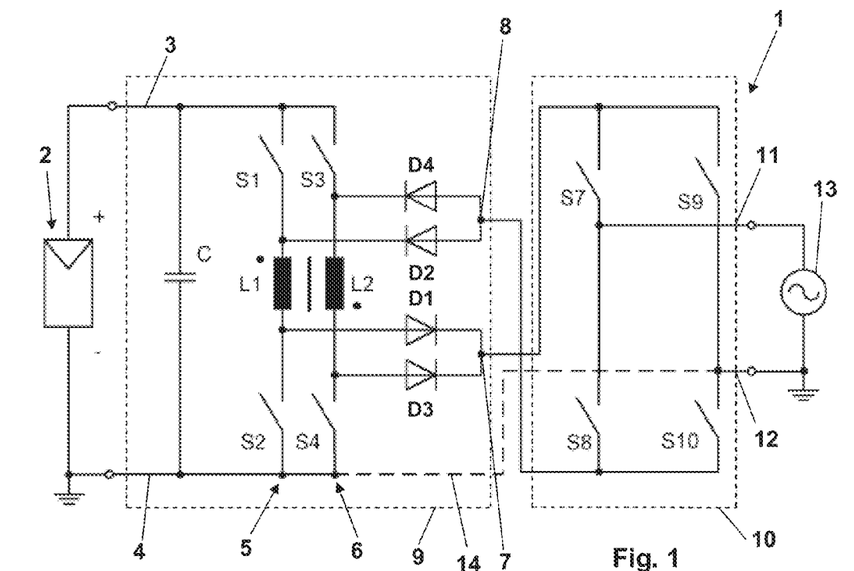
FIG. 1 shows a first embodiment of the inverter of the present disclosure in an application for feeding electric energy from a photovoltaic generator into a single-phase AC power grid.

Now referring in greater detail to the drawings, FIG. 1 shows an inverter 1 for feeding electric energy from a photovoltaic generator 2 into a single-phase alternating current grid 13. Here, the negative terminal of the photovoltaic generator 2 is earthed just as a zero conductor of the AC power grid 13. The photovoltaic generator 2 is connected to input lines 3 and 4 of the inverter 1. A buffer capacitance C provided by one or more individual capacitors is connected between the input lines 3 and 4. Further, a first series circuit 5 and a second series circuit 6 are connected between the input lines 3 and 4. Each series circuit 5 and 6 is made of two high frequency switches S1 and S2, and S3 and S4, respectively, and an inductance L1 and 2, respectively, arranged between the two switches S1 and S2, and S3 and S4, respectively. The two inductances L1 and L2 are magnetically coupled, e.g. made as two windings on a common core. From that side of the inductances L1 and L2 which points towards the input line 4 and thus to the negative terminal of the photovoltaic generator 2, a first rectifier diode D1 and a rectifier diode D3 which is called the third rectifier diode here lead to a first intermediate point 7, whereas a second rectifier diode D2 and a fourth rectifier diode D4 lead from a second intermediate point to the respective other side of the inductances L1 and L2. The blocking directions of the rectifier diodes D1 and D4 are oriented in such a way that even if the neighboring switches S1 to S4 switchable at a high frequency are closed, no current may flow directly from the input line 3 or 4 connected to the intermediate points 7 and 8 but only through the respective inductance L1 or L2. By means of operating the switches S1 to S4 in a suitable way at a high frequency, an alternating current may be formed between the intermediate points 7 and 8. Particularly the current may be formed to a sine-shape half-wave by half-wave. Additionally, the voltage present between the two input lines 3 and 4 may be boosted here. The input side circuitry part 9 of the inverter 1 reaching up to the intermediate points 7 and 8 may in principle also be used separately as a buck-boost-converter, i.e. as a DC/DC converter which may boost or buck an input voltage. Here, this input side circuitry part 9 primarily serves for sine-shaping the direct current between the intermediate points 7 and 8 half-wave by half-wave, and the output side unfolding circuit 10 of the inverter 1 feeds this direct current at a polarity alternating half-wave by half-wave via output lines 11 and 12 into the AC power grid 13. For this purpose, the unfolding circuit 10 comprises a full bridge between the intermediate points 7 and 8 including switches S7 to S10 switchable at the frequency of the alternating current. The output lines 11 and 12 are connected to mid-points of half-bridges of the full bridge in a known way. The switches S7 to S10 of the full bridge may be guided directly, i.e. operated by the alternating grid voltage.

In the following FIGS. 2 to 5 different switching states and the resulting current paths through the inverter 1 according to FIG. 1 are shown which are activated for forming the direct current having a sine-shape half-wave by half-wave between the intermediate points 7 and 8.

Figure 2:
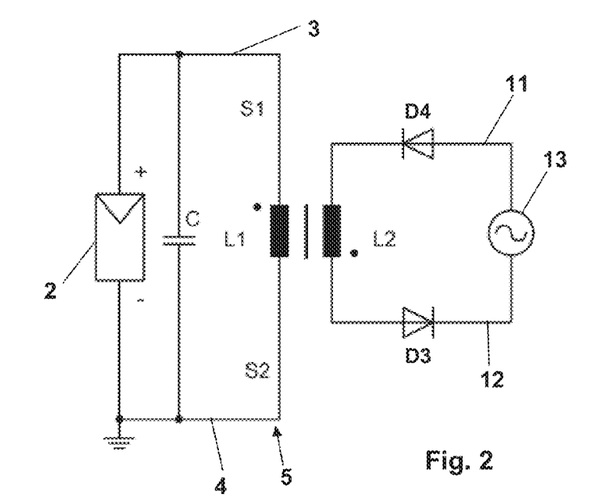
FIG. 2 illustrates a first switching state of the inverter according to FIG. 1.

According to FIG. 2, the switches S1 and S2 of the series circuit 5 are closed. Thus, the inductance L1 is energized. The two switches S3 and S4 of the second series circuit 6 are open and thus not depicted here. The second inductance L2 connected between the two switches S3 and S4 is de-energized via the diodes D3 and D4. Here, the current through the second inductance L2 is maintained by the magnetic coupling to the first inductance L1 and by its previous energization.

Figure 3:
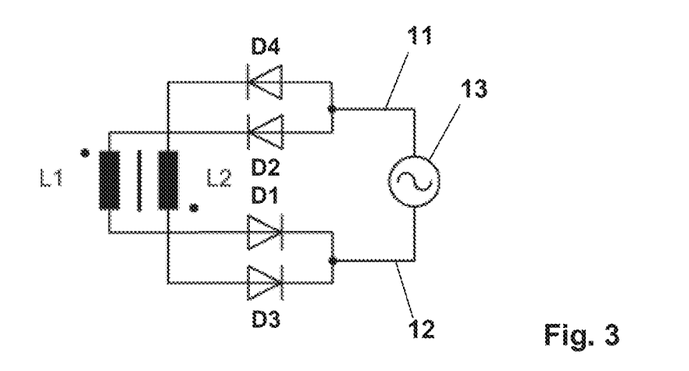
FIG. 3 illustrates a second switching state of the inverter according to FIG. 1.

According to FIG. 3, all high frequency switches S1 to S4 according to FIG. 1 are open. Due to the previous energization of the two inductances L1 and L2, the current through both inductances is driven into the AC power grid via the diodes D1 to D4.

Figure 4:
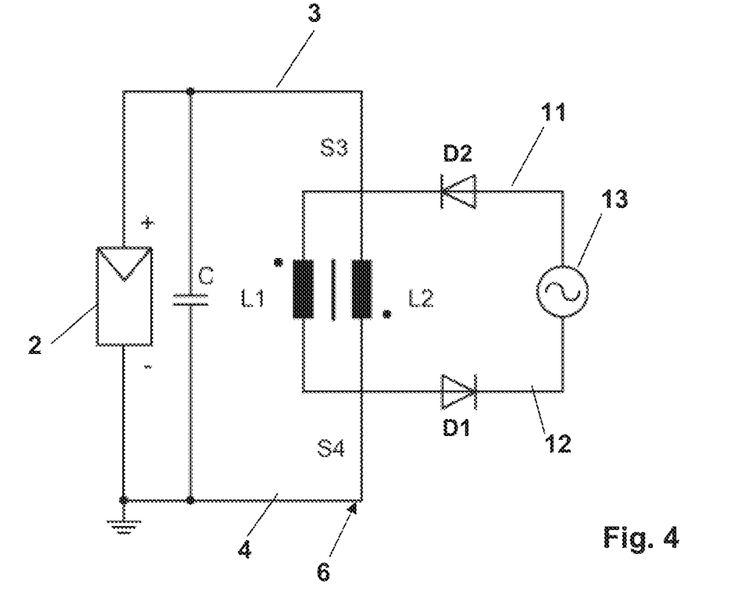
FIG. 4 illustrates a third switching state of the inverter according to FIG. 1.

According to FIG. 4, the opposite of the situation in FIG. 2 is present with regard to the series circuits 5 and 6. Here, the switches S3 and S4 are closed, whereas the switches S1 and S2 are open and are thus not depicted here. The inductance L2 is energized. Current flows from the inductance L1 into the AC power grid 13 via the diodes D1 and D2; and the current is maintained both by the magnetic coupling with the second inductance L2 and due to the previous energization of the inductance L1.

Figure 5:
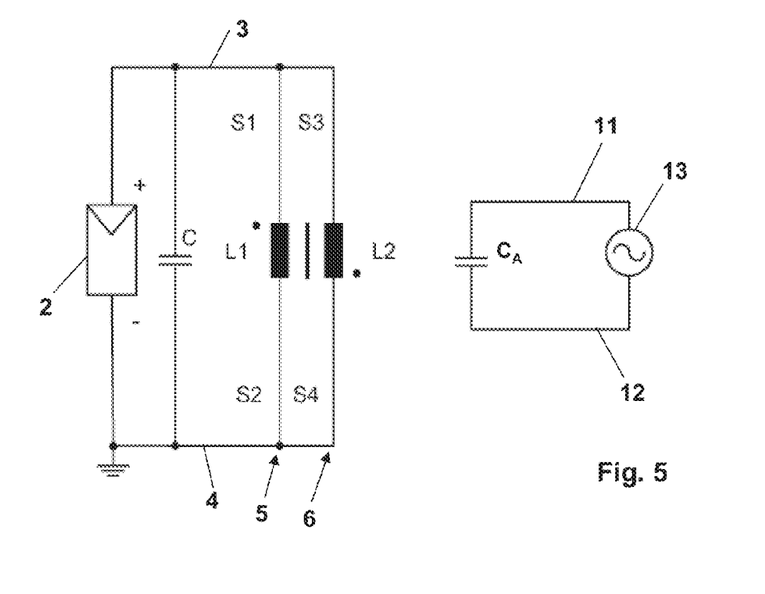
FIG. 5 illustrates a fourth switching state of a variant of the inverter of FIG. 1 supplemented with an buffer capacitance at its output.

FIG. 5 shows the situation when all four high frequency switches S1 to S4 according to FIG. 1 are closed to simultaneously energize both inductances L1 and L2 for boosting the input voltage. In this case, a current flowing in the direction towards the AC power grid 13 may only be maintained, if an additional output side capacitance $C_A$ is provided which is otherwise not needed in the inverter 1 according to FIG. 1.

Figure 6:
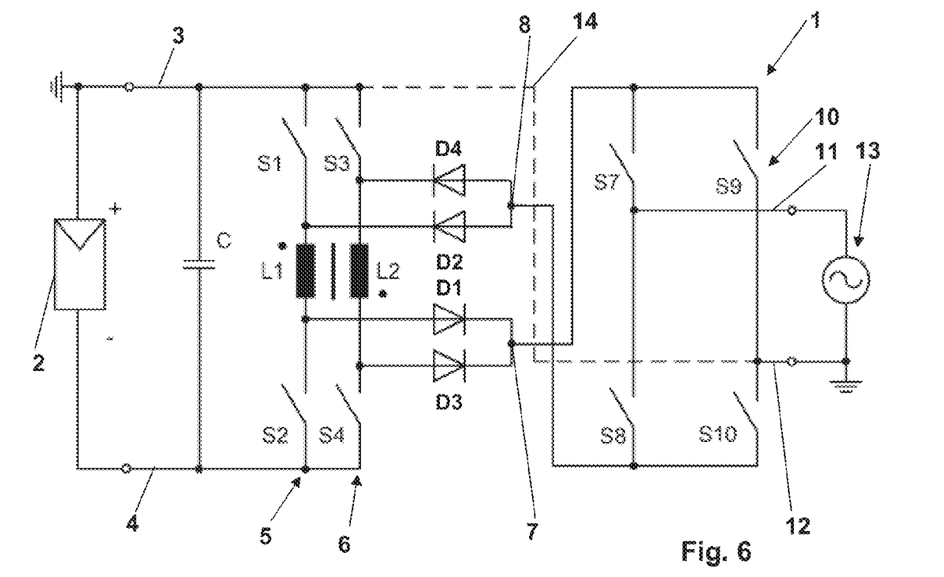
FIG. 6 shows an embodiment of the inverter with regard to earthing the photovoltaic generator.

Whereas in FIG. 1 an optional connection 14 of the earthed input line 4 and the earthed output line 12 was indicated with a dashed line, FIG. 6 shows such a connection 14 between the output line 12 and the input line 3 with a dashed line. This means that according to FIG. 6 the entire photovoltaic generator 2 is on a negative electric potential with regard to electric earth as its positive terminal is earthed. Vice versa, according to FIG. 1, the entire photovoltaic generator 2 is on a positive electric potential with regard to earth. Depending on the solar modules of which the photovoltaic generator 2 is made, one of these electric potentials may be advantageous for a long lifetime of the photovoltaic generator 2.

Figure 7:
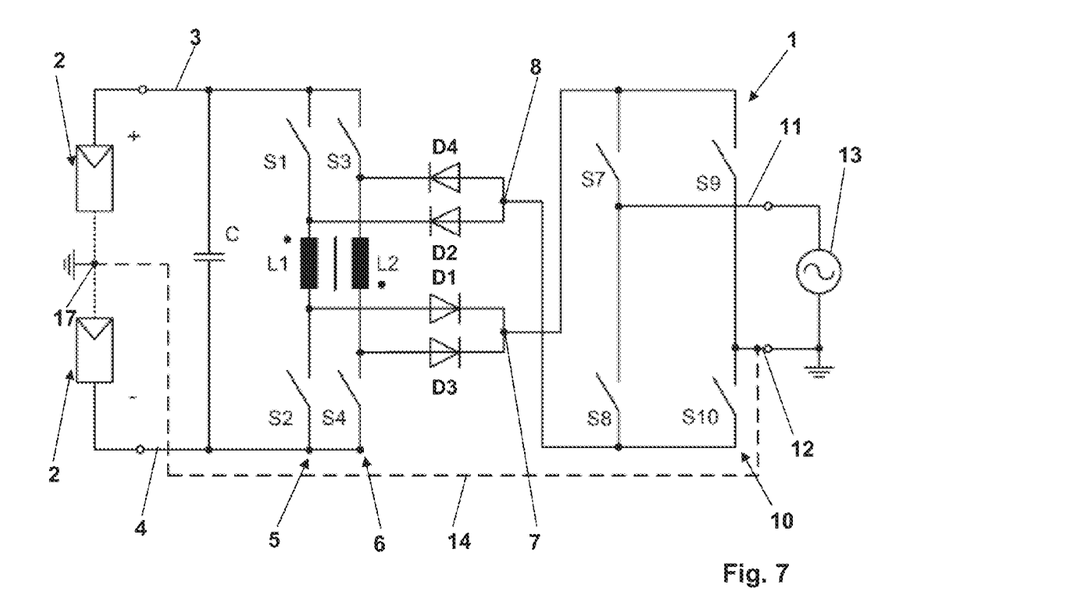
FIG. 7 shows another embodiment of the inverter with regard to earthing the photovoltaic generator.

In FIG. 7, the optional connection 14 indicated with a dashed line extends between the output line 12 and an intermediate point 17 of the photovoltaic generator 2 which is earthed here to, for example, limit the maximum voltages in the area of the photovoltaic generator with regard to earth to half of a PV-voltage provided by the photovoltaic generator. FIGS. 6 and 7, together with FIG. 1, demonstrate the degrees of freedom which are given when using the inverter 1, both with regard to earthing in the region of its input lines 3 and 4 and with regard to earthing in the region of its output lines 11 and 12.

Figure 8:
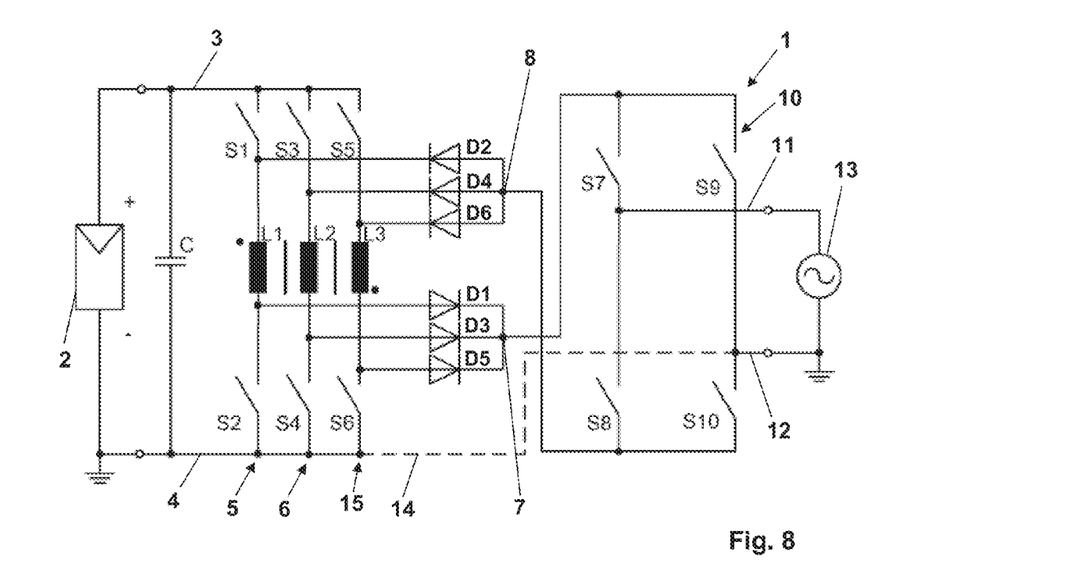
FIG. 8 a variant of the inverter according to the embodiment of FIG. 1 comprising three instead of only two series circuits each made of two switches operated at a high frequency and of one intermediate inductance and connected between first and second input lines.

FIG. 8 illustrates the option to increase the number of series circuits 5 and 6 by further series circuits each consisting of two high frequency switches and an intermediate inductance. Thus, one further series circuit 15 made of two high frequency switches S5 and S6 and of an inductance L3 connected in between and magnetically connected to the inductances L1 and L2 of the series circuits 5 and 6 is provided here. From that side of the inductance L3 pointing to the switch S6 which is connected to the input line 4, a fifth rectifier diode D5 leads to the intermediate point 7, whereas a sixth rectifier diode D6 leads from the intermediate point 8 to the other side of the inductance L3. By means of the additional series circuit 15, an even more continuous current flow between the intermediate points 7 and 8 can be generated despite its forming by pulse width modulation, even if the switches S1 to S6, e.g. at the beginning or the end of each sine-shaped half-wave, only have a short duty cycle to generate the small currents desired here.

Figure 9:
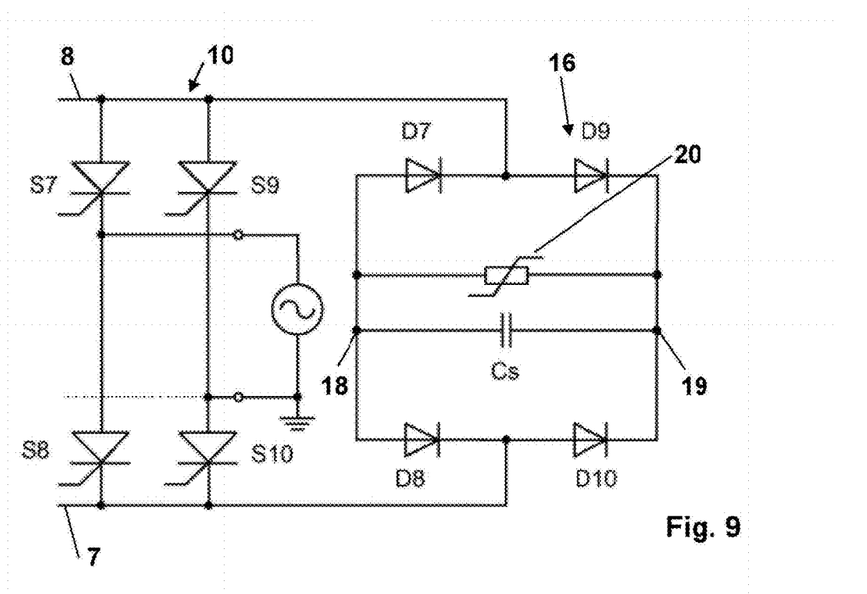
FIG. 9 shows a protective circuitry which can be connected in parallel to the unfolding circuit of the inverter according to any the previous figures.

FIG. 9 illustrates a protective circuitry 16 between the intermediate points 7 and 8 which is connected in parallel to the unfolding circuit comprising the switches S7 to S10. The protective circuitry 16 comprises a first series circuit of two opposing rectifier diodes D7 and D8 and a second series circuit of two opposing rectifier diodes D9 and D10 connected in parallel. Here, the rectifier diodes D7 and D9 on the one hand and D8 and D10 on the other hand comprise blocking directions opposing each other. The center points 18 and 19 of the two series circuits of the rectifier diodes D7 and D8 on the one hand and D9 and D10 on the other hand are connected via a capacitance $C_S$ and a varistor 20 connected in parallel. If overvoltages occur between the intermediate points 7 and 8 which may not be compensated for by the capacitance $C_S$ the varistor 20 becomes conductive and compensates the overvoltages by a direct flow of current between the intermediate points 7 and 8.

Figure 10:
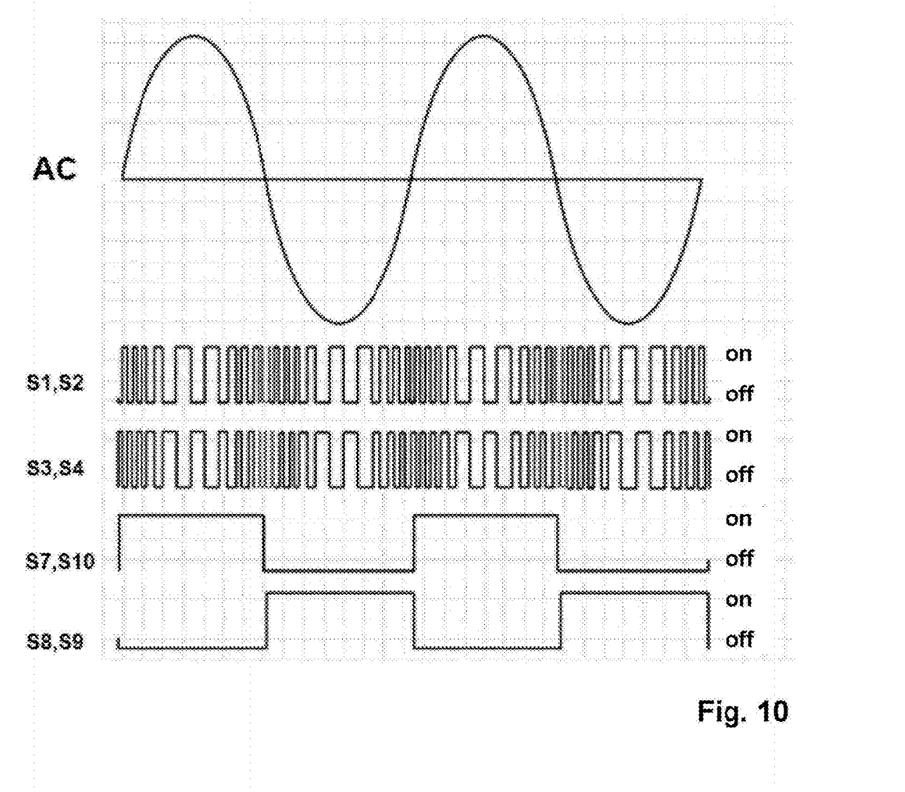
FIG. 10 is a graph of the control signals for the switches of the inverter according to FIG. 1 for forming an alternating current output out of a direct current input.

FIG. 10 illustrates the control signals for the high frequency switches S1 to S4 of the series circuits 5 and 6 of the inverter 1, which are operated at a high frequency here, and the control signals for the low frequency switches S7 to S9 of the unfolding circuit 10, which are operated at the frequency of the alternating current AC. The shaping of the alternating current into sine-shaped half-waves is effected by pulse width modulation at an equiphased operation of the switches S1 and S2 which is inversely phased with regard to an equiphased operation of the switches S3 and S4. Correspondingly, only the switching states according to FIGS. 2 and 4 are used here. The half-waves of the direct current between the intermediate points 7 and 8 are then forwarded to the output lines 11 and 12 of the inverter by operating the switches S7 to S10 in pairs as in a commutator so that the desired sine shaped alternating current AC flows between these output lines 11 and 12.

Many variations and modifications may be made to the preferred embodiments of the disclosure without departing substantially from the spirit and principles of the disclosure. All such modifications and variations are intended to be included herein within the scope of the present disclosure, as defined by the following claims.

The invention claimed is:

1. An inverter for converting a direct current flowing between first and second input lines into an alternating current flowing between first and second output lines, comprising:
   a first series circuit comprising a first switch configured to switch at a high frequency, a first inductance and a second switch configured to switch at a high frequency, and connected between the first and second input lines;
   a first rectifier diode leading from a first side of the first inductance to a first intermediate point, and a second rectifier diode leading from a second intermediate point to a second side of the first inductance;
   an unfolding circuit connected to the first and second intermediate points and to the first and second output lines, and comprising switches configured to switch at the frequency of the alternating current; and
   a second series circuit comprising a third switch configured to switch at a high frequency, a second inductance and a fourth switch configured to switch at a high frequency is connected between the first and second input lines,
   wherein the first inductance and the second inductance are magnetically coupled, and
   wherein a third rectifier diode leads from a first side of the second inductance to the first intermediate point, and a fourth rectifier diode leads from the second intermediate point to a second side of the second inductance.

2. The inverter of claim 1, further comprising:
   a third series circuit comprising a fifth switch configured to switch at a high frequency, a third inductance and a sixth switch configured to switch at a high frequency is connected between the first and second input lines,
   wherein the first inductance, the second inductance and the third inductance are magnetically coupled, and
   wherein a fifth rectifier diode leads from a first side of the third inductance to the first intermediate point, and a sixth rectifier diode leads from the second intermediate point to a second side of the third inductance.

3. The inverter of claim 1, wherein one of the first and second input lines is connected to one of the first and second output lines.

4. The inverter of claim 1, wherein one of the first and second input lines is connected to earth.

5. The inverter of claim 1, wherein a center point between the first and second input lines is connected to earth.

6. The inverter of claim 1, further comprising a buffering capacitance is connected between the first and second input lines.

7. The inverter of claim 1, wherein the unfolding circuit comprises:
   a first switch configured to switch at the frequency of the alternating current and connected to the first intermediate point and to the first output line,
   a second switch configured to switch at the frequency of the alternating current and connected to the second intermediate point and to the first output line,
   a third switch configured to switch at the frequency of the alternating current and connected to the first intermediate point and to the second output line, and
   a fourth switch configured to switch at the frequency of the alternating current and connected to the second intermediate point and to the second output line.

8. The inverter of claim 7, further comprising a control circuit configured to control all switches of the unfolding circuit configured to switch at the frequency of the alternating current is configured for line commutation of these switches by an AC power grid connected to the output lines.

9. The inverter of claim 7, wherein only switches configured to switch at the frequency of the alternating current are provided in all power current paths extending from the first and second intermediate points up to an AC power grid connected to the first and second output lines.

10. The inverter of claim 1, further comprising a protective circuitry is connected between the first and second intermediate points, the protective circuitry comprising two series circuits connected in parallel, each series circuit comprising two rectifier diodes conductive in opposite directions, wherein the rectifier diodes of the two series circuits comprise opposite blocking directions, and wherein center points of both series circuits are connected to each other both via a capacitance and a varistor connected in parallel.

* * * * *